United States Patent [19]

Hopkins

[11] 3,708,658
[45] Jan. 2, 1973

[54] PRESSURE MONITORED TEMPERATURE CONTROLLED SYSTEM FOR A LIQUID-VAPOR PROCESS

[75] Inventor: Byrd Hopkins, Longmeadow, Mass.

[73] Assignee: Monsanto Company, Saint Louis, Mo.

[22] Filed: April 29, 1971

[21] Appl. No.: 138,729

Related U.S. Application Data

[63] Continuation-in-part of Ser. No. 872,777, Oct. 30, 1969, abandoned.

[52] U.S. Cl. .........235/151.12, 260/80.78, 260/85.5, 260/86.7, 260/92.8 R, 260/93.5, 260/94.2, 260/87.5 R, 260/878 R, 260/880 R, 260/87.5 A, 260/92.1

[51] Int. Cl. .........C08f 1/98, G06f 15/46, G06g 7/58

[58] Field of Search.............260/94.9 P; 235/151.12, 151.12 MO, 235/151.12 MI

[56] References Cited

UNITED STATES PATENTS 2,886,616  5/1959  Mertz et al. .....................260/683.15
3,558,045  1/1971  Smith et al. .....................260/94.9 P

*Primary Examiner*—James A. Seidleck
*Assistant Examiner*—A. Holler
*Attorney*—John W. Klooster, James C. Logomasini, Richard W. Sternberg and Neal E. Willis

[57] ABSTRACT

A system for dynamically controlling the temperature of the liquid mass in a liquid-vapor phase process at a predetermined value. Pressure and temperature sensors are used to generate signals proportionate to the pressure and temperature within the vessel containing the liquid mass. The pressure signal is combined with a conversion factor to generate a calculated temperature signal. The calculated temperature signal is compared to the temperature sensor signal and the conversion factor is automatically corrected. The calculated temperature signal and a set temperature signal are compared to produce an error signal adapted to feed a temperature controller which controls heat transfer equipment regulating temperature of the liquid mass.

4 Claims, 6 Drawing Figures

PRESSURE MONITORED TEMPERATURE CONTROLLED SYSTEM FOR A LIQUID-VAPOR PROCESS

RELATED APPLICATION

This application is a continuation-in-part of application Ser. No. 872,777, filed Oct. 30, 1969, now abandoned.

BACKGROUND

In processes involving liquid-vapor phase mixtures, the need often arises for careful and dynamic control of temperature, and this is especially true of chemical reactions such as polymerization of monomer formulations. For example, in polymerization reactions involving a liquid mass with a vapor phase overhead, all in an enclosed vessel, the temperature of reaction and the changes therein that occur during the reaction frequently have a profound effect upon the physical and chemical properties of the polymer produced (e.g., its molecular weight, its color, etc.) as a result of which it becomes of utmost importance to monitor accurately and closely control the prevailing temperatures. Two criteria are fundamental to the attainment of fully effective temperature control: First, it is necessary to determine quickly and accurately the actual existing temperature in the liquid mass, and second, it is necessary to correct quickly and accurately any imbalances or deviations from desired temperatures that are found to exist.

While conventional apparatus can be used to achieve in practice the second criteria, there is a problem in achieving the first. The problem centers on the fact that, in an enclosed vessel containing a liquid mass with a vapor phase thereabove, there is an inherent time lag between the instantaneous measured temperature of such liquid mass and the instantaneous actual temperature thereof. This time lag results from the heat capacity of the temperature sensing element and the resistance to heat flow of the film between the liquid mass and the sensing element. As a consequence, a finite time is required for a temperature change in the liquid mass to cause a like change in the sensing probe itself.

On the other hand, the time lag between instantaneous measured pressure and the actual pressure in the vessel is substantially negligible. Since pressure in such a closed vessel can be regarded as a function of temperature, the pressure in the vapor phase is an indication of the temperature therein. Vapor phase pressure can be quickly and accurately measured. However, the use of pressure alone as a measure of temperature will introduce an error for all systems in which the liquid mass pressure vs. temperature relationship is not accurately known or is changing with time.

However, pressure sensing simultaneously with temperature sensing has been heretofore employed in reactor temperature control systems. For example, in the Mertz et al. U.S. Pat. No. 2,886,616, the control index of a pressure controller is reset in response to a temperature controller signal. Although such techniques may improve somewhat the rapidity of response to changing process conditions or changing temperature set points, an inherent deficiency associated therewith is that the temperature controller must correct for both the error between the set point and the measurement and the error caused by the change in pressure with temperature. The system of this invention overcomes this deficiency by using a calculation loop separate from the temperature controller to automatically determine the temperature vs. pressure relationships.

The present invention provides a system for dynamically monitoring and controlling temperature in the liquid mass of a liquid-vapor phase process, utilizing both instantaneous measured temperature of the liquid phase and instantaneous pressure of the vapor phase. This system may be used, among other things to monitor and control a polymerization reactor, and thereby achieve very precise temperature control of the liquid phase thereof. The system includes a method for dynamically determining and controlling the temperature of the liquid mass in a liquid vapor-phase process in quick and accurate response to the requirements thereof, as well as apparatus for accomplishing the practice of this method.

SUMMARY

The present invention is directed to a process for controlling temperature at any given time in an enclosed vessel. This vessel is of the type normally used in chemical processes and is functionally equipped with heat transfer equipment. When in use, the vessel contains a liquid mass with a vapor phase thereabove. In such a vessel, there is an inherent time lag between the instantaneous measured temperature of such liquid mass and the instantaneous actual temperature thereof, but the inherent time lag between instantaneous measured pressure within said vessel and the actual pressure therein is substantially negligible.

In the process of this invention, one practices certain steps. Initially, one simultaneously and independently substantially continuously generates respective signals representative of instantaneous measured temperature of such liquid mass and of instantaneous measured pressure in the vessel.

Then, one multiplies the pressure signal so produced by a constant signal and adds thereto a variable correction factor signal to generate a calculated temperature signal representative of actual liquid mass temperature. This sequence may be represented by the following equation:

1. $T_c = AP + Y$ wherein:
$T_c$ represents an instantaneous calculated temperature signal (i.e. a pressure compensated temperature value),
$A$ represents a pressure compensation constant whose value can range from about 0.1s to 10.0s, and wherein 2. $s = (T_2 - T_1/P_2 - P_1)$ and wherein $T_1$ and $T_2$ are, respectively, the minimum and maximum temperatures to occur in the liquid mass during the chemical process in the vessel, and $P_1$ and $P_2$ represent the minimum and maximum instantaneous pressures in the vapor phase above the liquid mass corresponding, respectively, to $T_1$ and $T_2$.
$P$ represents the pressure in the vapor phase above the liquid mass at a time corresponding to $T_c$, and
$Y$ represents a variable correction factor signal based upon the difference between the instantaneous sensed temperature ($T_m$) and the instantaneous pressure compensated temperature ($T_c$).

The variable correction factor signal y (see Equation (1)) is itself generated by first comparing the instantaneous measured temperature signal so produced to the calculated temperature signal, and then integrating the resulting difference signal so generated with respect to time. This sequence may be represented by the following equation:

(3) $$Y = B \int (T_m - T_c) dt$$

wherein $Y$, $T_m$, and $T_c$ have their above indicated meanings, and wherein:

B represents a temperature correction constant having units of time$^{-1}$ and a finite value less than $10t^{-1}$, and t is the temperature measurement time constant of the system, the integration operation being performed with respect to time ($dt$).

Finally, one compares the calculated temperature signal so generated with a set temperature signal representative of a prechosen liquid mass temperature at the time of said measuring to produce an error signal adapted to feed to a temperature controller, thereby to produce a control signal adapted to operate responsively the indicated heat transfer equipment, and so to reduce to zero any difference between said calculated temperature signal and said set temperature signal.

The system employs computing means operative upon the pressure (P) signal, the temperature ($T_m$) signal, and a set point ($T_s$) signal representative of the predetermined temperature value desired in the liquid mass; means for varying the temperature of the liquid mass and heat control means operative upon the temperature varying means for controlling the temperature of the liquid mass therein. The computing means dynamically solves the equations (1) and (3) above, and regulates the heat control means to minimize any differential that exists between the set point ($T_s$) value and pressure compensated temperature ($T_c$) and thereby establish the temperature of the liquid mass at a desired predetermined level.

The present invention is further directed to apparatus for controlling temperature at any given time in any enclosed vessel as described above. Such a vessel is equipped functionally with pressure sensing means, temperature sensing means, heat transfer means for controlling the temperature of the liquid mass responsive to signals, and a temperature controller adapted to operate and control the heat transfer means. Those skilled in the art will appreciate that the pressure sensing means comprises both first measuring means adapted to measure instantaneous pressure in said vessel, and means functionally associated therewith for generating a signal representative of such pressure measured by said first measuring means, and those skilled in the art will appreciate that the temperature sensing means comprises both second measuring means adapted to measure instantaneous temperature in said vessel, and means functionally associated therewith for generating a signal representative of such temperature measured by said second measuring means.

The apparatus includes a first signal generating means for generating a constant pre-selected signal. This constant signal is then fed to a signal multiplier means adapted to multiply an instantaneous pressure signal with such constant signal to produce a product signal.

A second signal generating means is used to generate a set signal representative of a prechosen liquid mass temperature.

A feature of the apparatus is a loop comprised of a first signal comparer means, a signal integrating means, a signal adder means. Input signals to the loop comprise such a product signal and an instantaneous measured temperature signal. Output signal from the loop is a calculated signal representative of actual instantaneous temperature of liquid mass in such an enclosed vessel (as indicated above).

In the loop, the signal adder means is adapted to sum a product signal and a variable correction factor signal to produce a calculated signal. The first comparer means is adapted to compare such calculated signal with an instantaneous measured temperature signal to produce a first error signal.

The integrating means is adapted to integrate with respect to time such first error signal thereby to produce such variable correction factor signal.

Finally, the apparatus includes a second signal comparer means adapted to compare such calculated signal with such set signal to produce a second error signal adapted for operating said temperature controller, whereby the desired control of such liquid mass temperature is achieved.

A particularly useful apparatus embodiment of the present invention is one suitable for generating a calculated signal representative of active instantaneous temperature of a liquid mass having a vapor phase thereabove both contained in an enclosed vessel. Such apparatus embodiment is adapted to be responsive to both a signal representative of instantaneous measured temperature of such liquid mass and to a signal representative of instantaneous pressure in said vessel. This apparatus comprises the first signal generating means described above, the signal multiplier means described above, and the loop described above, all in combination.

DRAWINGS

The present invention is better understood by reference to the attached drawings wherein:

FIG. 1 is block diagram illustrating the system of the present invention;

FIG. 2 is a schematic illustration of a temperature control system embodying the present invention as applied to a jacketed vessel and utilizing a combination of elements as shown in FIG. 1 that controls the amount of heat transfer through the vessel walls; and FIG. 3 is a schematic illustration of a second temperature control system embodying the invention, as applied to a vessel equipped with a reflux condenser and wherein the heat transfer capacity of the condenser is controlled by a combination of elements as shown in FIG. 1.

FIG. 4 is a schematic illustration of an embodiment of the present invention applied to a process for polymerizing styrene and acrylonitrile; and FIG. 5 is a schematic illustration of an embodiment of the present invention applied to a process for polymerizing vinyl chloride.

DETAILED DESCRIPTION

Figure 1:
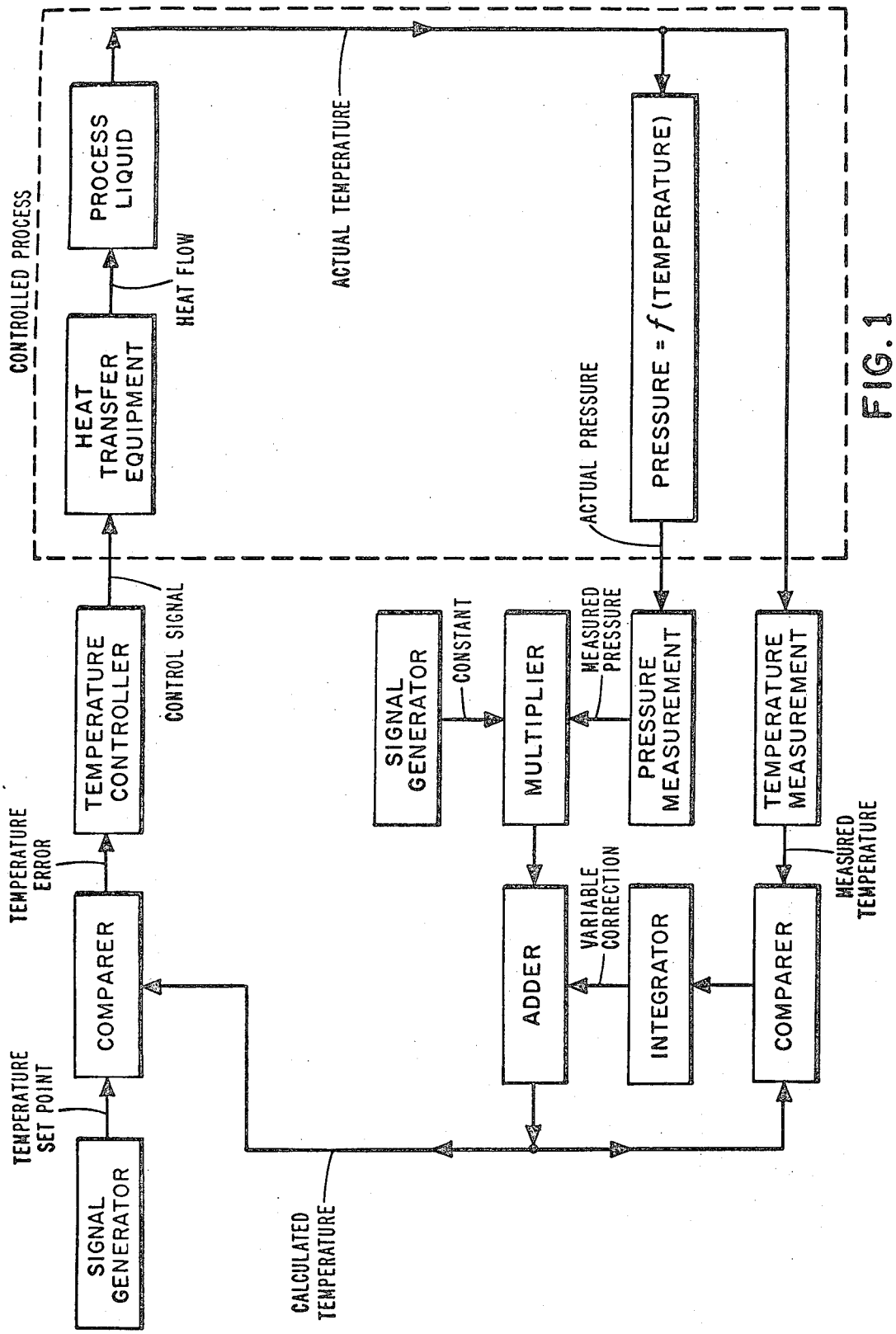

In the preferred embodiment of the invention, the computing means comprises a computing relay operative upon the pressure (P) signal to solve the equation (1) $T_c = AP + Y$, and to generate a signal proportionate thereto. Integrating means is connected to the computing relay and is operative upon the sensed temperature ($T_m$) signal and upon the pressure compensated temperature ($T_c$) signal from the computing relay to solve the equation $$(2) \quad Y = B \int (T_m - T_c) dt$$

and to generate a signal proportionate thereto for use in the computing relay. The system may also include second integrating means and a set point ($T_s$) signal generating device connected to the second integrating means to provide the setpoint ($T_s$) signal thereto. In such a system, the second integrating means is connected to the computing relay and is operative upon the pressure compensated temperature ($T_c$) signal and the set point ($T_s$) signal to generate a control signal proportionate to any differential therebetween. The second integrating means is also connected to the heat control means to provide the control signal thereto.

The means for varying the temperature of the liquid mass may comprise a reflux condenser, the heat exchange capacity of which is regulated by the heat control means in response to the computing means. Alternatively, or in addition thereto, the means for varying the temperature may comprise a jacket on the vessel providing an enclosed space between the jacket and at least a portion of the walls of the vessel through which heat transfer liquid may pass to effect the transfer of heat through the wall portion of the vessel, the heat exchange capacity thereof also being regulated by the heat control means in response to the computing means. In particularly desirable embodiments, the vessel is a sealed and agitated polymerization reactor, the temperature sensor is positioned in the vessel to contact the liquid mass contained therein, a mechanical cam-action signal generating device is used to provide the set point signal to the second integrating means, and the constant A is equal to 0.5s to 2.0s.

In accordance with the method of the invention, a process is conducted in a vessel under conditions such that there is a liquid mass with a vapor phase above it, and the vapor pressure (P) existing over the liquid mass is sensed and a signal proportionate thereto is generated. The temperature ($T_m$) within the vessel containing the liquid mass is also sensed, and a signal proportionate thereto generated. A set point ($T_s$) signal representative of the predetermined temperature desired in the liquid mass is generated and a control ($S_c$) signal, representative of any differential determined to exist between the actual temperature of the liquid mass, as indicated by a calculated pressure compensated temperature value ($T_c$), and the temperature desired therein, is generated based upon the solution of equations (1) and (2) hereinbefore defined. A condition affecting the temperature of the liquid mass in the process vessel is varied in response to the control ($S_c$) signal to control the temperature of the liquid mass to minimize any differentials that exist between $T_s$ and $T_c$ and thereby to establish the liquid mass temperature at the predetermined desirable level thereof.

The method is highly advantageously employed in the polymerization of a monomer formulation and wherein the temperature control is utilized to regulate the temperature occurring during polymerization. Ideally, the method is applicable to techniques wherein heat exchange is effected by indirect heat transfer with the liquid mass and by condensation of a portion of the liquid phase, thus permitting a high degree of control of the heat transfer media. Although the method is preferably one of process control, it may also be used simply to determine the temperature existing in the liquid mass of a liquid-vapor phase process.

Referring to FIG. 1, there is seen one embodiment of the operative principles of this invention. Thus, the dotted box designates a process being controlled, the process being one which would typically be practiced using an enclosed vessel. The process uses a process liquid with a vapor phase thereabove. The process liquid is operated upon by heat transfer equipment (e.g. which is associated with the enclosed vessel). This equipment controls the temperature of such liquid. The pressure within the vessel at any given time is a function of the temperature of the process liquid.

Process liquid temperature and vessel pressure are measured and signals representative of such respective values are generated in FIG. 1. The pressure measurement signal is fed to a multiplier where it is multiplied by a predetermined constant signal from a first signal generator to produce a product signal. The product signal and a variable correction signal are combined in an adder to form a calculated temperature signal. The calculated temperature signal is compared to the measured temperature signal in a first comparer to form an error signal. The error signal is integrated with respect to time to form the variable correction signal. The first comparer, integrator and adder form a loop which calculates the relationship between the temperature of the process liquid and the pressure in the vessel and thus reduces the error between the calculated temperature and the measured temperature to zero. The calculated temperature signal is also compared to a temperature set point generated by a second signal generator to form a temperature error. The temperature error is fed to a temperature controller to produce a control signal which operates the heat transfer equipment associated with the controlled process in such a way as to reduce the temperature error to zero.

Figure 2:
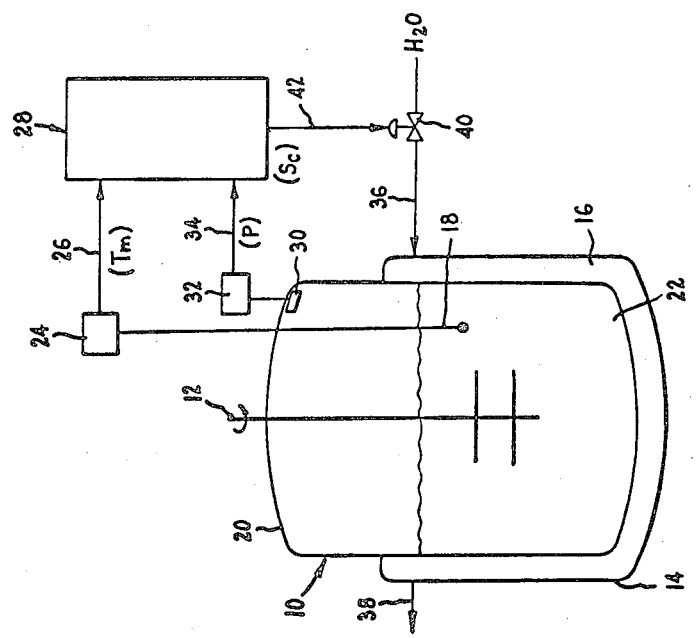

Turning now in detail to FIG. 2 of the appended drawings, diagrammatically illustrated is a temperature control system embodying the present invention as applied to a reaction vessel, generally designated by the numeral 10, which is fitted with an agitator 12. A jacket 14 extends about the lower portion of the reaction vessel 10 to provide a space 16 for the passage of a heat transfer liquid between the jacket 14 and the corresponding portion of the walls of the vessel 10.

A temperature sensor 18 extends through the top wall 20 of the vessel 10 into contact with the liquid mass 22 contained therewithin. The sensor 18 is connected to a temperature transmitter 24 which transmits a signal proportionate to the sensed temperature ($T_m$) through the pneumatic line 26 to an assembly of elements which can be termed a computer, generally designated herein by the numeral 28. Computer 28, in effect, can comprise all elements outside the dotted box in FIG. 1, less pressure and temperature measurement. A suitable transducer 30 is also provided within the vessel 10 for measurement of the pressure (P) existing above the liquid mass 22; the transducer 30 is connected to a pressure transmitter 32, which transmits a signal proportionate to the pressure within the vessel 10 to the computer 28 through pneumatic line 34.

An inlet conduit 36 extends between a source of water and the jacket 14 on the vessel 10 to provide the heat exchange medium to the space 16 therebetween, and an outlet conduit 38 is provided on the jacket 14 for flow of water outwardly from the space 16. The rate of flow of water through conduit 36 is regulated by the valve 40 therein, which, in turn, is controlled by a signal generated by the computer 28 and transmitted thereto through pneumatic line 42. To determine the appropriate value of the control signal ($S_c$) transmitted to the valve 40, the computer 28 operates upon the sensed pressure and temperature signals provided thereto from the transmitters 24, 32, respectively, and upon a set point signal representative of the desired temperature for the liquid mass derived from a source (not shown). However, the set point signal can be programmed directly into the computer 28. Based upon the control signal transmitted through line 42, the valve 40 is adjusted to permit an appropriate volume of water to flow into the space 16 to control the temperature of the liquid mass 22 to the value indicated by the setpoint signal, and a cooperating valve also controlled by the computer 28 could be provided on the outlet line 38 if so desired.

Figure 3:
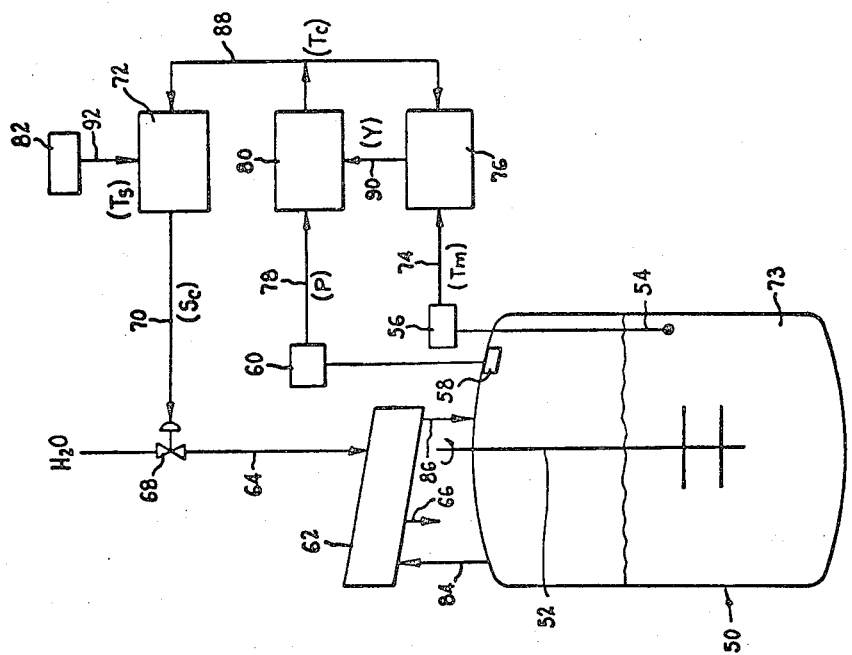

Turning now in detail to FIG. 3 of the drawing, a second reaction vessel, generally designated by the numeral 50, also is provided with an agitator 52, a temperature sensor 54, a temperature transmitter 56 connected thereto, a pressure transducer 58 and a pressure transmitter 60 connected to the transducer 58. However, rather than having jacketing 12 such as that in FIG. 1, to provide the means for heat transfer, vessel 50 has a reflux condenser 62 with water inlet and outlet conduits 64 and 66 respectively thereto. Interposed in the inlet conduit 64 is a valve 68, which is controlled through pneumatic line 70 from a proportional reset controller 72.

A signal proportionate to the sensed temperature ($T_m$) of the liquid mass 73 within the vessel 50 is transmitted from temperature transmitter 56 through pneumatic line 74 to the second proportional reset controller 76, and a signal proportionate to the pressure (P) thereover is transmitted from pressure transmitter 60 through pneumatic line 78 to the computing relay 80. The computing relay 80 operates upon the signal from the transmitter 60 to determine in a pressure-compensated temperature value($T_c$) and generates a signal proportionate thereto which is transmitted to each of the proportional reset controllers 72, 76 through pneumatic line 88. The proportional reset controller 76 operates upon the pressure compensated temperature ($T_c$) signal from the computing relay 80 and upon the sensed temperature ($T_m$) signal from the transmitter 56 to determine the value of a variable (Y) based upon the difference between those two temperature values; the controller 76 transmits a signal proportionate to the variable (Y) so determined through pneumatic line 90 to the computing relay 80 for use in its computation of the value of the pressure-compensated temperature ($T_c$).

The proportional reset controller 72 operates upon the signal representing the pressure compensated temperature ($T_c$) from the computing relay 80 and upon a set point ($T_s$) signal transmitted to it through pneumatic line 92 from the set point signal generating device 82, which may be a mechanical cam-action device. The reset controller 72 determines the difference between the value of the set point ($T_s$) signal and the pressure compensated temperature ($T_c$) signal and generates a control ($S_c$) signal proportionate thereto. The signal ($S_c$) is thereupon employed to control the valve 68 and regulate the flow of water through line 64 into the condenser 62, which, in turn, controls the heat transfer capacity of the condenser 62. The dotted box designated 28' embraces the combination of elements in FIG. 3 which are analogous to the computer 28 in FIG. 2.

In a conventional manner, vapors pass from the vessel 50 through conduit 84 to the condenser 62, and the condensate is refluxed to the reactor 50 through conduit 86. The rate of reflux and the amount of heat removed by the system is dependent upon the cooling capacity of the condenser 62, which in the illustrated embodiment is a function of the volume of water passing through it.

The effectiveness of the monitor and control system described herein is believed to be due to the ability which it affords for quickly monitoring the vapor pressure, as a close approximation of the temperature existing within the process mass, and for correcting the vapor pressure information so obtained to account for nonlinearity and time-varying temperature-pressure relationships, thereby permitting a high degree of accuracy. Thus, the pressure measurement provides a fast signal indicative of the prevailing temperature and the super-imposition of the slower temperature signal thereupon provides a correction factor to minimize steady state error.

The control system may be employed in connection with virtually any liquid/vapor process mass (i.e., consisting of a liquid phase with a vapor phase thereabove) in which the vapor pressure is a function of temperature and in which temperature control is a desired objective. The system provides increased responsiveness to changing conditions and discrepancies that may occur during a process cycle, and it minimizes instability or fluctuation of conditions therein. More particularly, such fluctuation is a result of the lag that occurs between the time that a process variable changes and the time that a counteracting effect is imposed upon the system. Thus, even though an undesired change (e.g. a temperature rise) has been fully corrected (e.g. by increased heat removal), the lack of responsiveness of the control system usually results in a failure to recognize that fact, as a result of which the corrective effect is not promptly cancelled (e.g. the increased level of heat removal continues after the temperature has been lowered to the desired point), thereby creating an opposite imbalance (e.g. the temperature falls too low). In this manner, the process conditions fluctuate and seldom attain a steady state situation at a desired temperature under dynamic conditions, and in some cases, the corrective influence imposed can carry the process to a condition more extreme than was the original imbalance, causing the process to "run away".

Although the control system has wide applicability to many different processes, including simple heat treatments and the like, it is particularly beneficially employed in connection with exothermic reactions wherein positive feedback of data reflecting evolved heat renders control very difficult. Moreover, it is especially effective for the control of polymerization reactions, wherein there is a great tendency for material to build up on the temperature sensing element and high viscosities are often encountered due to the production of polymer; both of these factors militate against the good heat transfer characteristics that are necessary for accurate monitoring of the temperature.

With particular regard to polymerization reactions, it should be understood that the specific technique employed for the polymerization is not critical to the invention and that it may be effected by mass, solvent solution, and aqueous dispersion techniques, so long as the process mass includes a liquid phase with a vapor phase over it and the pressure in the vapor phase is a function of temperature of the liquid phase. It should also be understood that the presence of solid material will not normally hamper control by the instant systems, and in polymerization reactions the process readily accomodates solid material including a dissolved or dispersed rubber phase in the liquid phase.

Exemplary of the compounds that can suitably be polymerized in a reaction controlled in accordance with the instant invention are the vinylidene monomers such as vinyl halides, monovinylidene aromatic hydrocarbons, and ethylenically unsaturated nitriles. With particular regard to vinyl halides, both vinyl chloride and vinyl fluoride may be employed as either the sole monomer or as the principal monomeric component in combination with other ethylenically unsaturated monomers that are copolymerizable therewith. Such comonomers include the vinyl esters of organic acids such as vinyl acetate; vinylidene halides such as vinylidene chloride; unsaturated nitriles such as acrylonitrile; (alk)acrylate esters such as ethyl acrylate and methyl methacrylate; maleates, fumarates; and the like.

The monovinylidene aromatic hydrocarbons include styrene, ring-substituted alkyl styrenes, ring-substituted halo-styrenes, ring-alkyl ring-halo-substituted styrenes, vinyl naphthalene, etc. Exemplary of other vinylidene monomers that can be employed as the basic monomers or interpolymerized with monovinylidene aromatic hydrocarbons are ethylenically unsaturated nitriles (particularly acrylonitrile, methacrylonitrile, and propacrylonitrile), alpha- or beta- unsaturated monobasic acids and derivatives thereof (such as acrylic and methacrylic acids and esters), vinyl esters (such as vinyl acetate, vinyl propionate), dialkyl maleates and fumarates, etc.

It may be desired to include in the monomer formulation up to about 15.0 per cent by weight thereof a preformed rubbery polymer onto which at least a portion of the polymerizable monomers may be grafted, and rubbery polymers conventionally used for this purpose include olefinic compounds such as polyethylene, chlorinated polyethylene, chlorosulfonated polyethylene, ethylene/acrylate copolymers, ethylene/propylene copolymers, ethylene/propylene/diene terpolymers, ethylene/vinyl acetate copolymers, natural rubbers, polyisoprene rubbers, acrylate rubbers, etc., and mixtures thereof. As is well known, the rubbery polymer most appropriate for use in a given instance will depend upon the specific monomer or monomers involved.

Although any catalyst or initiator suitable under the circumstances of a particular reaction may be employed, a particularly beneficial aspect of the invention resides in the fact that the increased speed and accuracy of control that it provides permits polymeriation reactions to be effected in a most efficient manner utilizing the so-called "fast" or highly active initiators. Such fast initiators reduce the expense of the process by making efficient use of available facilities, and may produce improved product by avoiding the presence of residual initiator and reaction by-products. The term "fast initiator" as applied to the polymerization of monomers, includes any free radical initiator having a half life of less than about 2.5 hours at the temperature of reaction, as determined by the decomposition rate of a 0.025 mol per liter solution thereof in 1,2-dichloroethane; preferably, the half life of such an initiator is less than about 1.5 hours under the same conditions. Particularly effective are the acetyl persulfonates of the type described by Beer et al. in U.S. Pat. No. 3,340,243, mono- and di-alkyl substituted peroxides, and symmetrical azo compounds. Normally, such initiators will be used in amounts of about 0.005 to 1.0 per cent, based upon the weight of polymerizable monomers present. The same principles may, of course, be extended to other reactions and references to polymerization is primarily for illustrative purposes.

The means for varying the temperature of the liquid mass may be of a type which acts directly or indirectly upon the liquid mass. Heat input or removal may be accomplished in any of numerous ways to regulate the temperature in the liquid mass, and as is indicated by the drawing under appropriate circumstances the temperature varying means may consist of jacketing on the vessel and/or a reflux condenser. Furthermore, control of temperature can be achieved through the introduction, removal or recycle of reagents or other materials, such as catalysts, reactants, products, etc. Reactive materials which have a negative effect upon reaction rate can also be used for control purposes, such as agents which are effective to "kill" or deactivate catalysts, when such are involved.

The present invention is of particular value because conventional hardware can readily be employed in the control systems thereof, and the particular components that will be appropriate in any given case will be readily apparent to those skilled in the art. As regards the vessel for containment of the process mass, the type will depend upon the particular material to be processed, the process which is to be conducted therein, and the means that is to be utilized for heat control. For example, when the process mass is a polymerizable formulation as in the illustrated embodiment, the vessel has an agitator (to optimize heat transfer through the process mass) and is suitably sealed, and it is provided with jacketing or a reflux condenser as the heat control means. It will be apparent that different vessels will be utilized as appropriate for different process masses.

The computing means may consist of a single digital or analog computer, or may be comprised of a multiplicity of individual components, such as summing devices, inegrating means, proportional controllers, and the like. The only basic requirements of the computing means are that it be capable of receiving the input signals previously described and that it operate upon them to solve the relationships stated; it should also be capable of generating a signal to which the temperature varying means is responsive. It should be appreciated that the particular mode of operation and the medium of communication among the various sensors, heat control means and computing means components are not critical, and that the computing operations may be carried out in any way and with any hardware or software that is appropriate. These factors will be apparent to those skilled in the art and numerous publications are available as an aid in making suitable selections. It is possible that the equations previously set forth may be expressed in different terms and may be combined and/or modified to alternate forms thereof. Nevertheless, any equivalent equations or relationships which can be used to develop a pressure-compensated temperature signal of the nature herein described are considered to be within the scope of the invention.

The equation that expresses the value of the pressure compensation constant A has been described hereinbefore, and it will be appreciated that A is simply a function of slope (s) of the temperature/pressure curve (plotted with temperature as a function of pressure); preferably, A is 0.5 to 2.0 times the value of the slope of the curve, and ideally it is equal thereto. If the value of A is less than about 0.1s, the pressure factor becomes quite insignificant and the benefits of the invention are not adequately realized; on the other hand, an unduly large value of A will render the system unsatable and thus of little value.

The temperature constant B is an inverse function of the time constant of the system and must be of an appropriate magnitude if control is to be satisfactory. It must be greater than zero, but may be very close thereto if changes occurring in the process are very slow because of its use in an integral equation; if the value of B is too great the control system will tend to be unstable. Time constant is a concept that is well known in the process control art, and is defined (*Process Instruments and Control Handbook* — Considine, First Edition) as the time required for a varying quantity to reach within $1/e$ of its total change (approximately 63.2 percent of its total change). To illustrate its meaning in the present context, if a step change in the actual temperature of the process occurs, the time constant of the system is the time that is required for the measured or sensed temperature to change 63.2 per cent of the difference value prior to the step change and the target value which it should attain as a result of the change in actual temperature.

The means for sensing the temperature and pressure within the process mass may also be conventional and may take a wide variety of forms depending upon the process mass and the computing equipment used. Although the sensing means referred to herein may be a single device capable of both sensing the desired condition and of also generating a signal proportionate thereto, different elements may be employed to serve each of those functions, such as a sensor connected to a transmitting device. Ordinarily, transducers of a suitable nature will be employed, and, for example, temperature measurements may conveniently be made by suitably designed thermister bridge arrangements. It should be appreciated that, although temperature measurements will normally be made by direct contact with the liquid phase of the process mass, this is not essential and the temperature sensor may be located thereabove; however, the best results are obtained with the former arrangement. Finally, the selection of means for interconnecting the various components of the control system will be dependent upon the particular components involved and may conveniently take the form of pneumatic or hydraulic lines, or it may involve electrical interconnections. Generally, the control systems will utilize a combination of two or more of such different types of interconnections.

EMBODIMENTS

The following examples are set forth to illustrate more clearly the principles and practice of this invention to one skilled in the art and they are not intended to be restrictive but merely to be illustrative of the invention herein contained. All parts are parts by weight unless otherwise indicated.

EXAMPLE I

Water is heated in a well-insulated, sealed, agitated, jacketed reaction vessel that is fitted with steam and cold water inlets to the jacket. A temperature sensor is immersed in the water and is pneumatically connected to a proportional controller, which receives signals from the temperature sensor and a variable set point device for comparison therebetween. The controller generates a signal proportionate to differentials between the sensed temperature and the set point value, which is employed to open or close valves on the steam and cold water inlets as is appropriate to bring the water temperature to the set point value. After heating the water to 120°C., the set point value is raised to 125°; the measured temperature gradually rises to about 126.5° during a period of about 4.5 minutes; in the next 3 minutes it falls to 125°. and thereafter continues downwardly to record a value of about 124.5° about 9.5 minutes after the change in set point; then the temperature again rises to approach the desired value, attaining it only after a total elapsed time of about 13 minutes.

A system utilizing the concepts of the present invention (see embodiment of FIG. 2) is set up for comparison with the foregoing. The same equipment is employed, but in addition, a computer 28 is used and the vessel is provided with a pressure sensor to measure and transmit the vapor pressure over the water. The computer operates upon the sensed pressure and temperature and generates a pressure compensated temperature signal which is proportionate thereto, for use in the proportional controller. Thus, rather than comparing the set point signal with a directly measured temperature, in this part of the example the proportional controller compares the set point value with a pressure compensated temperature. The computer is programmed to solve the equations hereinbefore designated (1) and (2), and employs as values for the constants A and B 1.16 and 0.1, respectively (the slope of the temperature pressure curve is 1.16°C. per psi for water, and the time constant of the system is 1 minute; thus A equals the slope and B is greater than zero and less than $10t^{-1}$).

In the same manner as was previously described, after heating the water to 120°C. the set point value is increased to 125°C. About 1.5 minutes thereafter a pressure compensated temperature value very slightly in excess of 125° is determined by the system; at 2 minutes after the change the value has dropped to very slightly less than 125°., after which the determined temperature levels off at the desired value with substantially no further variation. Although the direct measurement system is optimized as described and the system using pressure compensated temperatures is not, in the latter case a close and essentially constant value of the actual temperature is obtained in about 1.5 minutes after a change therein, whereas in the former case comparable results are not attained before 13 minutes elapsed time. Thus, any process using the control system of the invention has the benefit of temperature data which much more quickly and accurately reflects the actual changes that occur therein and thereby permits much closer control of the process than was possible heretofore.

EXAMPLE II

A suitable jacketed reaction vessel equipped with reflux is charged with 100 parts of water, 60 parts of styrene, 30 parts of acrylonitrile, 0.1 part of t-dodecyl mercaptan, 0.25 part of sodium chloride, 0.03 part of di-t-butyl peroxide, and 0.1 part of di-t-butyl-p-cresol. This charge is deoxygenated by boiling in an inert atmosphere and then heated with agitation under inert atmosphere and then heated with agitation under inert gas pressure to polymerize the monomers at a time-temperature cycle of 2 hours at 118°C., 2 hours at 125°C., 3 hours at 135°C., and 2 hours at 145°C. During the polymerization reaction, the following additions are made to the reaction mixture:

1. At 26 percent conversion—3 parts of a 1 percent aqueous solution of an acrylic acid-2-ethylhexyl arcylate copolymer having a combined acrylic acid content of 93.5–98.5 mol percent,
2. Between 40 and 90 percent conversion—10 parts of styrene added continuously,
3. At 40 percent conversion—0.1 part of t-dodecyl mercaptan, and
4. At 60 percent conversion—0.1 part of t-dodecyl mercaptan.

Polymerization is terminated at 98 percent conversion. Unreacted monomers are distilled from the product, which is then cooled, dewatered, washed, and dried.

Figure 4:
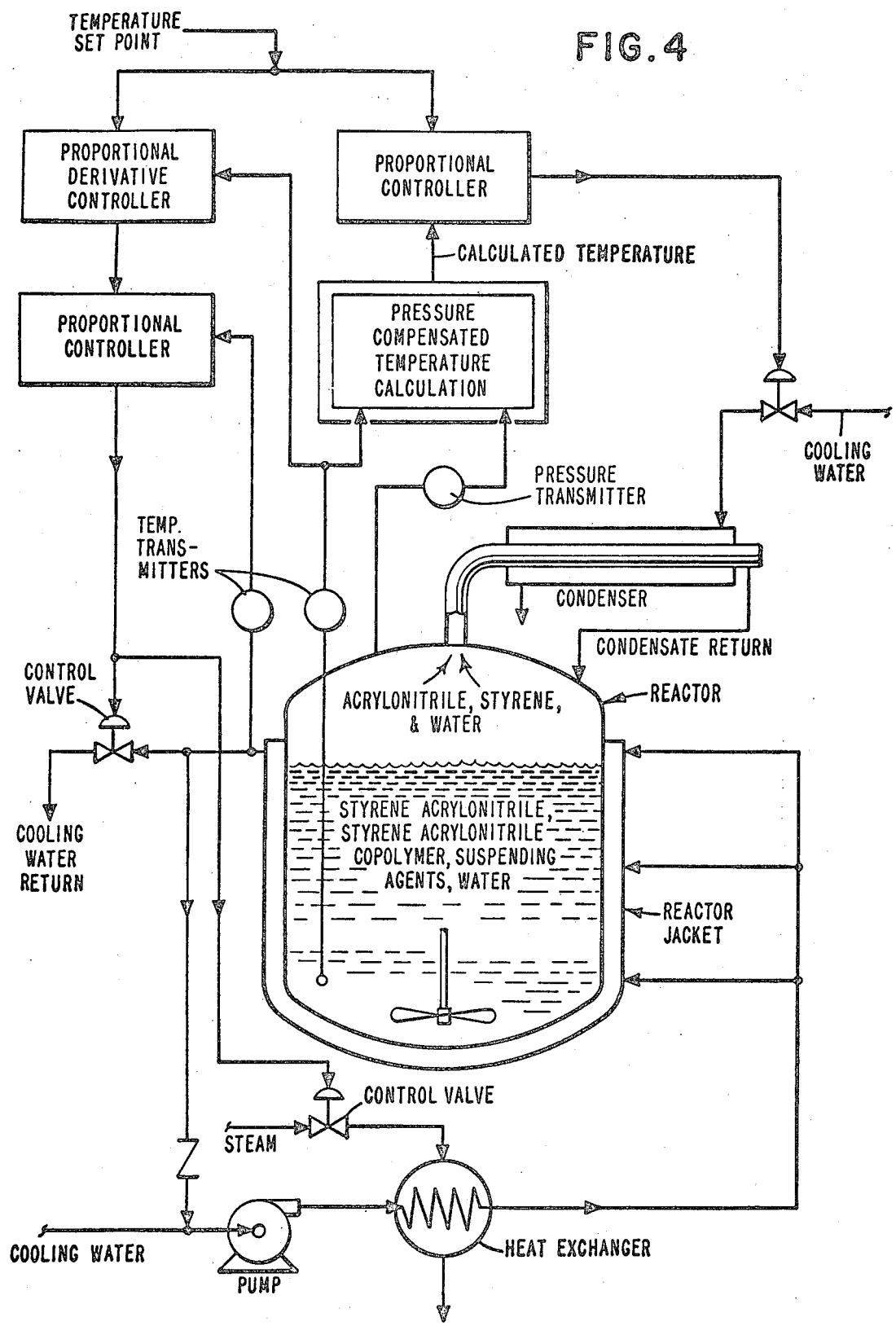

The equipment and control system employed are as shown in FIG. 4 for this bath suspension polymerization of styrene/acrylonitrile copolymer. The pressure compensated temperature calculation is accomplished using elements as shown above in FIGS. 1 and 3, except that here a single reactor employs jacket cooling and reflux condenser. Temperature of the liquid mass in the reactor is maintained within ± 0.15°C. throughout the cycle.

EXAMPLE III

Into a jacketed reaction vessel fitted with a reflux condenser and having means for injecting water, are charged 150 parts water at a temperature of about 55–60°C., and a 1.0:1.0 combination of a cellulose ester and a partially hydrolyzed polyvinyl acetate. The cellulose ester is a hydroxypropyl methyl cellulose having a 2.0 per cent aqueous solution viscosity of about 50 centipoises at 20°C., sold by The Dow Chemical Co. under the trademark METHOCEL 65 HG. The hydrolyzed polyvinyl acetate has a residual acetate content of about 35 percent and a 4 percent aqueous solution viscosity of about 10 centipoises at 20°C.; it is sold under the trademark GELVATOL D 369 by Monsanto Co. The combination of suspending agents is introduced in an amount sufficient to provide about 0.085 part thereof. Thereafter, about 0.16 part of sorbitan monolaurate surfactant (SPAN 20, a product of Atlas Chemical Industries, Inc.) is charged, and the resulting mixture agitated together with a small amount of a heat stabilizer (2,6-ditertiarybutyl paracresol).

The reaction vessel is then vented, and 150 parts of vinyl chloride monomer are charged thereinto. Next, a solution of diisopropyl peroxydicarbonate in diethyl maleate is added with agitation to provide about 0.048 part of initiator, immediately after which polymerization commences (the heat necessary therefor being furnished by the hot water charged initially).

During the initial stages of polymerization, a cooling medium i.e., city water, is fed into the vessel jacket to maintain the temperature therein within about 0.25°C. of 54.0°C. After about one hour and about 13.0 percent of the polymerizable monomers is converted to polymer, the reflux condenser is cut into the system by causing cooling water to flow therethrough, the condenser having been open to the reactor at all times. The reaction is continued for about 2½ to 2¾ hours more until about 75.0 to 80.0 per cent of the monomers is polymerized. At that point, the "heat kick" occurs and about 0.05 gallon of water per pound of polymerization mixture is injected immediately into the reactor. A brief temperature rise is noted and actuates the water injection to decrease the temperature to 54°C. which temperature is maintained substantially constant for about one-half to three-quarters hour more to carry the reaction to about 92 percent conversion of the monomers. The resin is recovered from the reaction mixture and some may be used to prepare specimens for evaluation.

Some of the resin is compounded with plasticizer, pigment and stabilizer in a Brabender Test to provide molded specimens of one-half gram weight for visual evaluation. The test specimens average 10 "fish eyes" which is considerably below the 35 maximum specified for commercial resins produced by use of the prior suspension polymerization technique. The specific viscosity of a solution of 0.4 gram in 100 milliliters of cyclohexanone is 0.48 and the bulk density is 0.48 gram per cubic centimeter. Porosity measurements indicate the resin to exhibit more than 15 percent greater porosity than the resin produced by the prior suspension polymerization technique.

Screen analysis (U.S. Standard sieve) of the beads produced by the process is as follows:

| Screen, mesh | Per cent Retained |
|---|---|
| 40 | 0 |

| | |
|---|---|
| 60 | 2 |
| 80 | 27 |
| 100 | 40 |
| 140 | 25 |
| 200 | 5 |
| Pan | 1 |

Figure 5A:
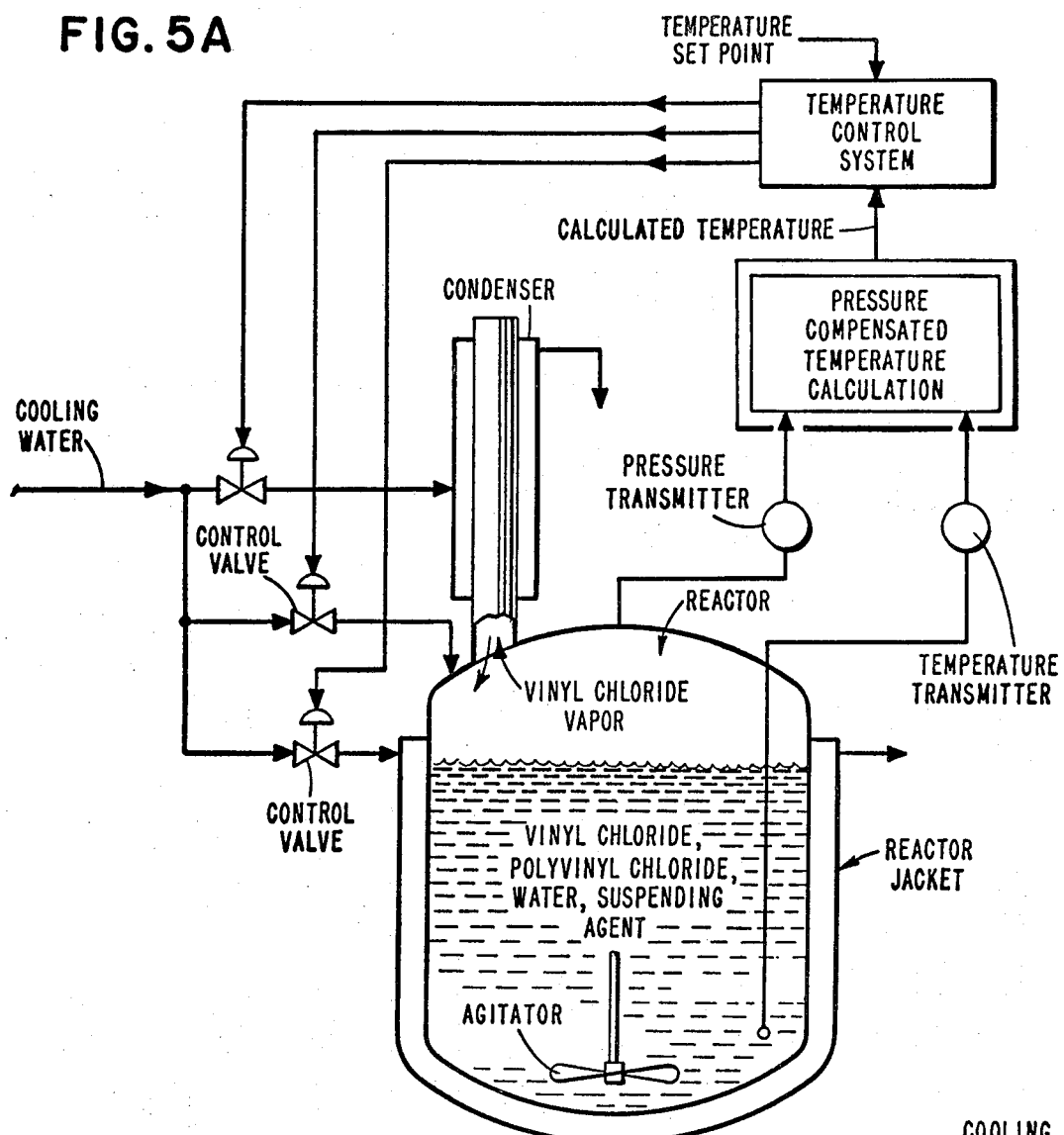
Figure 5B:
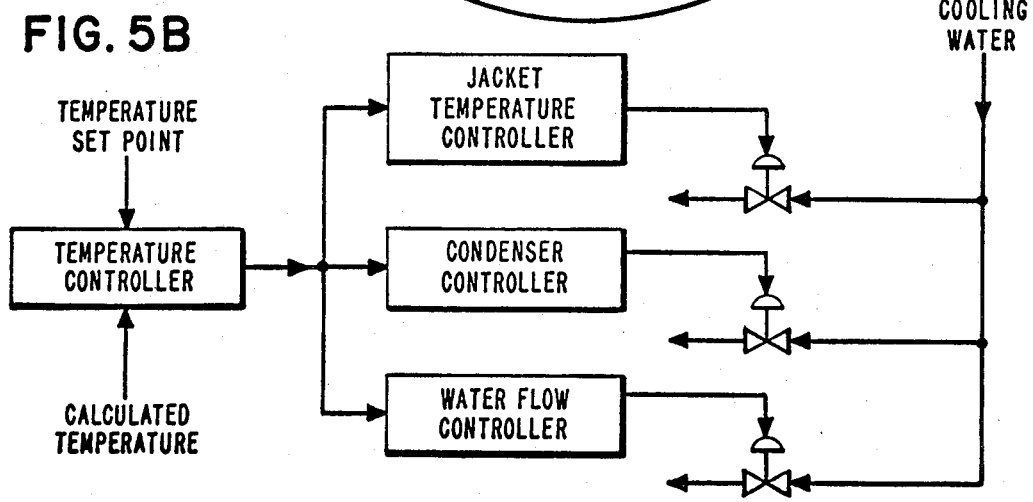

The equipment and control system employed are as shown in FIG. 5, parts A and B, wherein Part A illustrates the overall apparatus configuration for this batch suspension polymerization of vinyl chloride while Part B illustrates detail of using the calculated signal representative of actual instantaneous temperature of the liquid mass in the reactor to control actual temperature thereof through a batch temperature controller feeding separate control elements for jacket temperature control, reflux condenser operation, and external water addition. The pressure compensated temperature calculation is accomplished using elements as shown above in FIGS. 1 and 3, except that here a single reactor employ jacket cooling, reflux condenser cooling, and cool water addition in effecting temperature control. Temperature of the liquid mass in the reactor is maintained within ± 0.15°C. throughout this cycle.

What is claimed is:

1. A process for controlling, with a temperature controller, the temperature at any given time of liquid in an enclosed vessel functionally equipped with heat transfer equipment and containing a liquid mass with a vapor phase thereabove wherein there is an inherent time lag between the instantaneous measured temperature of such liquid mass and the instantaneous actual temperature thereof, but where the time lag between instantaneous measured pressure within said vessel and the actual pressure therein is substantially negligible, said process comprising the steps of:
   A. simultaneously and independently substantially continuously generating respective signals representative of instantaneous measured temperature of such liquid mass and instantaneous measured pressure,
   B. multiplying the pressure signal so produced by a constant signal and adding thereto a variable correction factor signal to generate a calculated temperature signal representative of actual liquid mass temperature, and
   C. comparing said calculated temperature signal and a set temperature signal representative of a prechosen liquid mass temperature to produce an error signal adapted to feed to said temperature controller, thereby to produce a control signal adapted to operate responsively said heat transfer equipment and so to reduce to zero any difference between said calculated temperature signal and said set temperature signal,
   D. said variable correction factor signal itself being generated by first comparing the measured temperature signal so produced to said calculated temperature signal and then integrating the resulting difference signal so generated with respect to time.

2. Apparatus for generating a calculated signal representative of actual instantaneous temperature of a liquid mass having a vapor phase thereabove both contained in an enclosed vessel, said apparatus being responsive both to a signal representative of instantaneous measured temperature of said liquid mass and to a signal representative of instantaneous pressure in said vessel, said apparatus comprising in combination:
   A. signal generating means for generating a constant pre-selected signal,
   B. signal multiplier means adapted to multiply an instantaneous pressure input signal with said constant pre-selected signal to produce a product signal,
   C. signal comparer means,
   D. signal integrating means,
   E. signal adder means,
   F. said signal comparer means, said signal integrating means, and said signal adder means being functionally interconnected into a loop whose input signals consist essentially of said product signal and an instantaneous measured temperature signal and whose output signal is the desired calculated temperature signal,
   G. said signal adder means being adapted to sum a said product signal and a variable correction factor signal to produce a said desired signal,
   H. said signal comparer means being adapted to compare said desired signal with an instantaneous measured temperature signal to produce an error signal, and
   I. said integrating means being adapted to integrate with respect to time said error signal thereby to produce said variable correction factor signal.

3. Apparatus for generating an error signal representative of the difference between a desired temperature and a calculated signal representative of actual instantaneous temperature of a liquid mass having a vapor phase thereabove both contained in an enclosed vessel, said error signal being adapted to operate a temperature controller, said apparatus being responsive both to a signal representative of instantaneous measured temperature of said liquid mass and to a signal representative of instantaneous pressure in said vessel, said temperature controller being functionally associated with said vessel and adapted to control heat transfer means likewise functionally associated with said vessel, said apparatus comprising in combination:
   A. first signal generating means for generating a constant pre-selected signal,
   B. signal multiplier means adapted to multiply an instantaneous pressure input signal with said constant pre-selected signal to produce a product signal,
   C. second signal generating means for generating a set signal representative of a prechosen liquid mass temperature,
   D. a first signal comparer means,
   E. a signal integrating means,
   F. a signal adder means,
   G. said first signal comparer means, said signal integrating means, and said signal adder means being functionally interconnected to a loop whose input signals consist essentially of said product signal and an instantaneous measured temperature signal, and whose output signal is a calculated signal representative of actual instantaneous temperature of a liquid mass in said vessel, and wherein:
      1. said signal adder means is adapted to sum said product signal and a variable correction factor signal to produce said calculated signal,
      2. said first comparer means is adapted to compare said calculated signal with an instantaneous measured temperature signal to produce a first error signal, and 3. said integrating means is adapted to integrate with respect to time said first error signal thereby to produce said variable correction factor signal, H. a second signal comparer means adapted to compare a said calculated signal with said set signal so as to produce a second error signal which is the desired error signal.

4. An apparatus affording dynamic control of a liquid mass temperature at a desired predetermined value in a liquid phase/vapor phase process conducted in a defined zone and wherein temperature is a function of pressure and further where, in said liquid phase, there is an inherent time lag between the instantaneous measured temperature and the instantaneous actual temperature thereof, while, in said zone, the time lag between instantaneous measured pressure and the actual pressure therein is substantially negligible, said apparatus comprising in combination:

A. a vessel for containment of a liquid mass with a vapor phase thereabove;

B. pressure sensing means including first measuring means adapted to measure instantaneous pressure in said vessel, and means functionally associated therewith for generating a signal representative of such pressure measured by said first measuring means, C. temperature sensing means including both second measuring means adapted to measure an instantaneous temperature in said vessel and means functionally associated therewith for generating a signal representative of such temperature measured by said second measuring means to produce an instantaneous measured temperature signal, D. heat transfer means adapted to regulate the temperature of said liquid mass, E. a temperature controller means adapted to operate and control said heat transfer means, F. first signal generating means for generating a constant pre-selected signal, G. signal multiplier means adapted to multiply said instantaneous pressure signal with said constant signal to produce a product signal, H. second signal generating means for generating a set signal representative of a prechosen liquid mass temperature, I. a first signal comparer means, J. a signal integrating means, K. a signal adder means, L. said first signal comparer means, said signal integrating means, and said signal adder means being functionally interconnected into a loop whose input signals consist essentially of said product signal and said instantaneous measured temperature signal, and whose output signal is a calculated signal representative of actual instantaneous temperature of a liquid mass in a said vessel, and wherein:

1. said signal adder means is adapted to sum said product signal and a variable correction factor signal to produce said calculated signal, 2. said first comparer means is adapted to compare said calculated signal with said instantaneous measured temperature signal to produce a first error signal, and 3. said integrating means is adapted to integrate with respect to time said first error signal thereby to produce said variable correction factor signal, and M. a second signal comparer means adapted to compare a said calculated signal with said set signal to produce a second error signal adapted for operating said temperature controller, whereby the desired control of said liquid mass temperature is achieved.

* * * * *